US007106784B2

(12) United States Patent
Eltawil et al.

(10) Patent No.: US 7,106,784 B2
(45) Date of Patent: Sep. 12, 2006

(54) UNIVERSAL RAKE RECEIVER

(75) Inventors: Ahmed Eltawil, Los Angeles, CA (US); Babak Daneshrad, Encino, CA (US)

(73) Assignee: Sasken Communication Technologies Limited, Bangalore (IN)

(*) Notice: Subject to any disclaimer, the term of this patent is extended or adjusted under 35 U.S.C. 154(b) by 691 days.

(21) Appl. No.: 10/057,430

(22) Filed: Jan. 25, 2002

(65) Prior Publication Data
US 2003/0142726 A1 Jul. 31, 2003

(51) Int. Cl.
H04B 1/69 (2006.01)
H04B 1/707 (2006.01)

(52) U.S. Cl. .................... 375/148; 375/147; 375/150; 375/152

(58) Field of Classification Search ............. 375/316, 375/130, 147, 148, 150, 152
See application file for complete search history.

(56) References Cited

U.S. PATENT DOCUMENTS

| | | | |
|---|---|---|---|
| 5,109,390 A | | 4/1992 | Gilhousen et al. |
| 5,602,833 A | | 2/1997 | Zehavi |
| 5,764,687 A | | 6/1998 | Easton |
| 5,790,589 A | | 8/1998 | Hutchison, IV et al. |
| 5,903,550 A | | 5/1999 | Spock |
| 5,970,084 A | * | 10/1999 | Honda .................... 375/147 |
| 6,229,839 B1 | | 5/2001 | Levin et al. |
| 6,310,869 B1 | | 10/2001 | Holtzman et al. |
| 6,600,907 B1 | * | 7/2003 | Taguchi ................ 455/132 |
| 6,608,858 B1 | * | 8/2003 | Sih et al. ................ 375/147 |
| 6,680,727 B1 | * | 1/2004 | Butler et al. ............ 375/144 |
| 2001/0014114 A1 | * | 8/2001 | Balterseee et al. ...... 375/148 |
| 2001/0048723 A1 | * | 12/2001 | Oh ....................... 375/261 |
| 2002/0127983 A1 | * | 9/2002 | Black et al. ............. 455/135 |
| 2002/0131479 A1 | * | 9/2002 | Butler et al. ............ 375/147 |
| 2003/0067898 A1 | * | 4/2003 | Challa et al. ............ 370/335 |
| 2003/0086481 A1 | * | 5/2003 | Sih et al. ................ 375/147 |
| 2003/0128678 A1 | * | 7/2003 | Subrahmanya et al. ..... 370/335 |
| 2003/0142734 A1 | * | 7/2003 | Black et al. ............. 375/149 |

OTHER PUBLICATIONS

Esmael H. Dinan, et al., "Spreading Codes for Direct Sequence CDMA and Wideband CDMA Cellular Networks," IEEE Communications Magazine, pp. 48-54, Sep. 1998.

Erik G. Ström, et al., "Maximum Likelihood Synchronization of DS-CDMA Signals Transmitted Over Multipath Channels," Dept. of Signals and Systems, Communications Systems Group, Chalmers University of Technology, Göteborg, SWEDEN, pp. 1-5, prior to 2001.

(Continued)

Primary Examiner—Chieh M. Fan
Assistant Examiner—Jason M. Perilla
(74) Attorney, Agent, or Firm—Welsh & Katz, Ltd.

(57) ABSTRACT

A universal rake receiver architecture includes modular independent processing units that can be flexibly programmed to support different modes of operation. The processing units are capable of performing the basic correlation calculations of DS-CDMA and each unit has an internal local memory and controller that controls its mode of operation. Each unit performs the required synchronization and demodulation operations for a multipath of a signal in the digital domain using all-digital frequency and timing correction techniques. Frequency feedback need not be supplied to the analog section of the receiver. Interpolation most preferably is used to find the optimum sampling position of each incoming chip. This independence allows the receiver to be used with one to several antennas without design modifications.

37 Claims, 9 Drawing Sheets

OTHER PUBLICATIONS

Keith Onodera, et al., "A 75mW 128MHz DS-CDMA Baseband Correlator for High-Speed Wireless Application," Dept. of Electrical Engineering and Computer Sciences, University of California, Berkeley, pp. 1-2, prior to 2001.

G.J.R. Povey, et al., "Simplified Matched Filter Reveiver Designs for Spread Spectrum Communications Applications," Electronics & Communication Engineering Journal, pp. 59-64, Apr. 1993.

Loke Kun Tan, et al., "A 200 MHz Quadrature Digital Synthesizer/Mixer in 0.8 μm CMOS," IEEE Journal of Solid-State Circuits, vol. 30, No. 3, pp. 193-200, Mar. 1995.

Lars Erup, et al., "Interpolation in Digital Modems-Part II: Implementation and Performance," IEEE Transactions on Communications, vol. 41, No. 6, pp. 998-1008, Jun. 1993.

Floyd M. Gardner, "Interpolation in Digital Modems-Part I: Fundamentals," IEEE Transactions on Communications, vol. 41, No. 3, pp. 501-507, Mar. 1993.

Abdellatif Bellaouar, et al., "Low-Power Direct Digital Frequency Synthesis for Wireless Communcations," IEEE Journal of Solid-State Circuits, vol. 35, No. 3, pp. 385-390, Mar. 2000.

Mao Yu, et al., "An Improved Correlator for CDMA Receivers," Applied Microwave & Wireless, pp. 28-34, prior to 2001.

Henry T. Nicholas, III, et al., "The Optimization of Direct Digital Frequency Synthesizer Performance in the Presence of Finite Word Length Effects," 42nd Annual Frequency Control Symposium, pp. 357-363, 1988.

D.P. Noel, et al., "Frequency Synthesis: A Comparison of Techniques," Department of Electronics, Carleton University, Ottawa, Ontario, Canada, pp. 535-538, prior to 2001.

Sirote Ratanamahatana, et al., "Channel Estimation for Power Controlled 3G CDMA," IEEE, pp. 2429-2433, 2000.

E. Del Re, et al., "Practical RAKE Receiver Architecture for the Downlink Communications in a DS-CDMA Mobile System," IEE Proc.-Commun., vol. 145, No. 4, pp. 277-282, Aug. 1998.

Xu Changlong, et al., "Performance Analysis of the RAKE Receiver of CDMA2000 Reverse Link," National Mobile Communications Research Laboratory of Southeast University, China, pp. 578-581, prior to 2001.

Massimiliano Marton, "Blind Adaptive Detection DS/CDMA Signals on Time-Varying Multipath Channels with Antenna Arrays Using High-Order Statistics," IEEE Transactions on Communications, vol. 48, No. 9, pp. 1590-1600, Sep. 2000.

Bernard Sklar, "Rayleigh Fading Channels in Mobile Digital Communication Systems Par I: Characterization," IEEE Communications Magazine, pp. 90-100, Jul. 1997.

Bernard Sklar, "Rayleigh Fading Channels in Mobile Digital Communication Systems Part II: Mitigation," IEEE Communications Magazine, pp. 90-100, Sep. 1997.

Ramjee Prasad, et al., "An Overview of CDMA Evolution Toward Wideband CDMA," IEEE Communications Surveys, http://www.comsoc.org//pubs/survey, vol. 1, No. 1, pp. 2-29, Fourth Quarter 1998.

* cited by examiner

Fig. 10

| PROCESSING UNIT | RESOURCE | MULTIPATH ANTENNA | SPREADING FACTOR | ORTHOGONAL CODE | PURPOSE |
|---|---|---|---|---|---|
| PU 1 | CORRELATOR #1 | MP 1/ANT. 1 | 256 | ONE | PILOT |
| | CORRELATOR #2 | MP 1/ANT. 1 | 256 | ONE | TIMING RECOVERY |
| | CORRELATOR #3 | MP 1/ANT. 1 | 256 | TWO | CHANNEL ONE |
| | CORRELATOR #4 | MP 1/ANT. 1 | 128 | THREE | CHANNEL TWO |
| | CORRELATOR #5 | MP 2/ANT. 1 | 256 | ONE | PILOT |
| | CORRELATOR #6 | MP 2/ANT. 1 | 256 | ONE | TIMING RECOVERY |
| | CORRELATOR #7 | MP 2/ANT. 1 | 256 | TWO | CHANNEL ONE |
| | CORRELATOR #8 | MP 2/ANT. 1 | 128 | THREE | CHANNEL TWO |
| | CORRELATOR #9 | MP 3/ANT. 2 | 256 | ONE | PILOT |
| | CORRELATOR #10 | MP 3/ANT. 2 | 256 | ONE | TIMING RECOVERY |
| | CORRELATOR #11 | MP 3/ANT. 2 | 256 | TWO | CHANNEL ONE |
| | CORRELATOR #12 | MP 3/ANT. 2 | 128 | THREE | CHANNEL TWO |
| | CORRELATOR #13 | POWERED DOWN | | | |
| | CORRELATOR #14 | POWERED DOWN | | | |
| | CORRELATOR #15 | POWERED DOWN | | | |
| PU 2 | POWERED DOWN | | | | |
| PU 3 | POWERED DOWN | | | | |

Fig. 11

| PROCESSING UNIT | RESOURCE | MULTIPATH ANTENNA | SPREADING FACTOR | ORTHOGONAL CODE | PURPOSE |
|---|---|---|---|---|---|
| PU 1 | CORRELATOR #1 | MP 1/ANT. 1 | 256 | ONE | PILOT |
| | CORRELATOR #2 | MP 1/ANT. 1 | 256 | ONE | TIMING RECOVERY |
| | CORRELATOR #3 | MP 1/ANT. 1 | 256 | TWO | CHANNEL ONE |
| | CORRELATOR #4 | MP 1/ANT. 1 | 128 | THREE | CHANNEL TWO |
| | CORRELATOR #5 THRU 15 | POWERED DOWN | | | |
| PU 2 | CORRELATOR #1 | MP 2/ANT. 1 | 256 | ONE | PILOT |
| | CORRELATOR #2 | MP 2/ANT. 1 | 256 | ONE | TIMING RECOVERY |
| | CORRELATOR #3 | MP 2/ANT. 1 | 256 | TWO | CHANNEL ONE |
| | CORRELATOR #4 | MP 2/ANT. 1 | 128 | THREE | CHANNEL TWO |
| | CORRELATOR #5 THRU 15 | POWERED DOWN | | | |
| PU 3 | CORRELATOR #1 | MP 3/ANT. 2 | 256 | ONE | PILOT |
| | CORRELATOR #2 | MP 3/ANT. 2 | 256 | ONE | TIMING RECOVERY |
| | CORRELATOR #3 | MP 3/ANT. 2 | 256 | TWO | CHANNEL ONE |
| | CORRELATOR #4 | MP 3/ANT. 2 | 128 | THREE | CHANNEL TWO |
| | CORRELATOR #5 THRU 15 | POWERED DOWN | | | |

UNIVERSAL RAKE RECEIVER

This invention was made with Government support under Contract US DOD N39998-98-C-3567 awarded by the Defense Advanced Program Agency (DARPA). The Government has certain rights in the invention.

BACKGROUND OF THE INVENTION

1. Field of the Invention

The present invention relates to a rake receiver with a flexible architecture suitable for demodulating direct sequence code division multiple access (CDMA) communications or other types of CDMA communications.

2. Description of the Related Art

Aspects of this disclosure relate to code division multiple access (CDMA) technology. CDMA technology is presently used in a number of wireless communication applications including cellular telephone networks. Other applications of CDMA technology include satellite communications, some global positioning communication systems and wireless LANs and WANs using CDMA modems. CDMA is a spread spectrum technique that spreads a signal over a frequency band to achieve more robust and efficient communication. Typically a signal transmitted using CDMA is spread in frequency with a pseudonoise (PN) code. A PN code generally is expressed as a characteristic set of binary valued chips defined over a range of frequencies spanning the bandwidth of the communication channel. Direct sequence spread spectrum (DSSS) modulation techniques multiply a signal to be transmitted with the PN code that identifies the user or communication link and transmits the resulting modulated signal. Using the spreading code to expand the spectrum of the signal is the code division part of CDMA communication. The multiple access aspect of CDMA reflects the fact that multiple users can use the same bandwidth at the same central frequency for communication.

Multiple users can communicate over the same frequency band of a CDMA link because each of the users is assigned a different PN code and that user's signals are modulated with their assigned PN code prior to transmitting the signals over the network. Receivers despread and detect a particular user's signal according to the assigned or expected PN code. PN codes are nearly orthogonal and so can be used to identify users present on a single channel using the same frequency band. Often the communication between a base station and a mobile handset is accomplished over two channels having similar bandwidth characteristics but separated in frequency so that full duplex communication can proceed. This might be true whether the network is used for cellular telephony or a wireless LAN or WAN application. Because these channels are separated in frequency, the same PN code can be used to spread the user's signals on the two non-overlapping bandwidths of the two channels.

In a typical cellular telephone network, both the base station and the handset transmit and receive signals. The transmitted signals may vary significantly in power and quality because of the physical characteristics and limitations of the base station and the handset. Received signals can be of varying amplitudes with varying levels of noise. In such a cellular network, the separation between the cellular base station and the handset can vary significantly, particularly since the handset may be in an automobile. The range of amplitude variations can be large. Variations in receiver and transmitter position exist in other applications but are pronounced in cellular telephone applications and mean that a receiver may need to recover signals whose magnitude varies considerably.

Another challenge of cellular telephony is that of multipath propagation. When the cellular telephone network is within an urban environment or other environments with significantly varying terrain, a signal travelling between a base station and a handset may reach the receiver directly or after having reflected off of a building or other objects. Different portions of the signal may propagate along significantly different paths and a number of these different paths may be received at a receiver at substantially the same time. Different multipaths experience different levels of attenuation, phase delay and can arrive at different angles. Wireless communication subject to multipath propagation exhibits significant variations in received signal characteristics for small changes in the relative position of the receiver. These rapid variations for small changes in position are known as Rayleigh fading due to the power distribution of the received signal under such conditions. Because it uses a spread spectrum, CDMA communication has natural advantages in reducing the problems associated with multipath propagation. Diversity reception within the CDMA system can be used to achieve still better performance.

Diversity reception refers to the process whereby multiple receive channels are used to recover different portions of a signal. In the case of multipath propagation, the receiver might include two independent receiving channels. The two independent receive channels might be assigned to the two strongest multipaths that arrive at the receiver. Processing is performed to align the two strongest multipaths and the two multipaths are added according to an appropriate weighting scheme. Overall signal strength and signal to noise properties are improved. The rake receiver architecture is especially well suited to performing this form of diversity reception.

For multipath discrimination to be possible in the CDMA system, there should be a minimum separation between the times when the multipath signals are received. The minimum separation should be at least one chip in the PN sequence. When there is at least one chip difference in the reception time between two multipath signals there will be at least one chip of offset between the embodied PN codes. In CDMA systems, the PN codes are selected so that two PN codes separated in time by at least one chip have very low cross correlation and so can be treated as independent signals and processed accordingly so that the signals can be combined. This minimum difference in reception time or chip duration of course varies for different systems but is such that in most urban settings appropriate delays will exist between multipaths to make diversity reception generally advantageous.

Mobile receivers such as handsets or terminals identify base stations according to pilot signals transmitted by base stations. Pilot signals have particular characteristics that make them particularly well suited to identify appropriate base stations for the mobile receiver's communication and to allow the mobile receiver to detect aspects of the base station's identification, system timing and control signals. Information from the pilot signal is used by the mobile receiver to synchronize to the timing of the base station. Pilot signals are used to distinguish between different base stations, thus enabling the mobile terminal to accurately identify a specific base station and establish communication. Receivers generally identify the strongest pilot signal as the appropriate one to acquire and initiate communications with the corresponding base station.

PN codes used in present implementations of CDMA communication are sufficiently close to orthogonal to identify a given signal traveling through different multipaths to a receiver. Because they are not fully orthogonal, PN codes are not generally adequate to separate different data streams for a single user. Orthogonal codes are used for that purpose. For example, the pilot signal is spread by a specific orthogonal code while the data and control streams for a user may be spread by other orthogonal codes. When the base station transmits user signals to a mobile receiver, the user signals are modulated depending on the specific communication scheme in use. The orthogonal coding used for different communication links is generally set by standard, vary among different applications, and are expected to continue to evolve over time.

Rake receivers are known in the art. Useful illustrations of conventional aspects of rake receivers are provided, for example, by U.S. Pat. No. 5,764,687 entitled "Mobile Demodulator Architecture for a Spread Spectrum Multiple Access Communication System," which patent is hereby incorporated by reference in its entirety. Aspects of conventional rake receivers are discussed here with reference to FIG. 1, which illustrates aspects of U.S. Pat. No. 5,764,687. Further aspects of rake receivers are illustrated in U.S. Pat. No. 5,903,550 entitled "Method and System for Parallel Demodulation of Multiple Chips of a CDMA Signal." This patent is similarly incorporated by reference in its entirety for its teachings regarding aspects of the implementation and operation of rake receivers.

The wireless channel changes dynamically over time. This change is slow enough to be considered constant over a sufficiently short duration of time conventionally known as the coherence time. This coherence time is a function of the channel parameters and the speed of the mobile terminal relative to the base station. Over a coherence time the receiver should be able to estimate the channel characteristics and coherently sum up all of the different multipath contributions from the rake fingers. Each rake finger should then be able to track the variations that occur over time for its assigned multipath component. For example, each rake finger usually includes the ability to track the timing of a received multipath signal and to adjust the rake finger's timing for data recovery as the delay of the assigned multipath varies. The rake finger may also track other characteristics of the multipath signal that vary with time.

FIG. 1 provides an overview of a conventional implementation of a rake receiver 10 for a CDMA communication system that includes three rake fingers 12, 14, 16 for demodulation and one rake finger used as a searcher 24. Each finger 12, 14, 16 consists of two despreaders, one for pilot processing and one for data demodulation. Once assigned to a multipath, the finger continues to receive and process the pilot signal as required. The rake receiver 10 coherently combines the three multipaths using estimates of the amplitude and phase of the three strongest paths. This is accomplished in the signal combiner 26 within the demodulator 22. Each multipath component of the signal is weighted, phase adjusted and delay-adjusted using channel estimates. The total signal is a coherent sum of the three strongest multipaths.

The FIG. 1 rake receiver includes an analog front end section 18 that receives RF signals from an antenna. The analog section 18 down-converts the received RF signal to IF (intermediate frequency) or baseband, where it is over-sampled by the sampling clock 20. Usually this oversampling is relatively high, such as eight times the chip rate, to allow timing recovery techniques to synchronize the system.

The digitized I (in phase) and Q (quadrature) signals are then presented to the demodulating block 22 where the searcher 24 starts to test different delays of the locally generated PN code (not shown) against the received pilot I and Q signals. The searcher 24 tests for energy at different delays for the target PN code. Once the searcher detects a sufficient level of energy for a given delay, the searcher declares a lock on the signal and establishes the delay for recovering that signal. The searcher 24 informs the controller 26 of the lock and that a candidate offset is available. The controller 26 then transfers the state information to one of the available fingers 12, 14, 16 to initiate a fine tracking algorithm and signal demodulation.

The analog front end 18 is operated under closed loop control. Gain control information is fed back from a gain control section 28 to provide automatic gain control feedback to the analog front end 18. Frequency control information is derived by a frequency control section 30 from the signals output by the rake fingers 12, 14, 16. Frequency control section 30 provides frequency information to the analog front end 18 as a feedback signal to maintain a coarse lock for frequency recovery.

Each rake finger 12, 14, 16, operating in conjunction with the analog front end, has the capability of tracking a specific assigned multipath and correcting for the effects of propagation, including phase rotation and frequency and timing drifts. Demodulation is accomplished using correlators within each of the fingers to provide a multipath component of the signal. After correction, the multipath components from the rake fingers are combined together to give a soft estimate of the received symbol. The signals and the soft estimate are passed on to a slicer or channel decoder that generates a final, hard symbol decision.

Fine tracking is performed within the fingers 12, 14, 16 and involves two processes. The first is timing tracking, where the timing tracking loop measures energy on two sides (early and late) of the sample that is assumed to be the correct sampling instant. The second process determines the difference in energy between these two side samples. The difference in energy is then filtered and processed to control a decimator that selects which samples are to be chosen from the incoming oversampled data stream. Thus the ideal sampling instant is fine-tuned in steps of chip period divided by the oversampling ratio. The decimated sample stream is then despread by the I and Q PN codes to generate the pilot samples ($P_I$, $P_Q$). Furthermore the orthogonal modulation is uncovered to generate the data samples ($D_I$, $D_Q$). As discussed above, I and Q are the inphase and quadrature components of the pilot and data sequences, respectively.

The pilot signal is used to estimate the rotation of the associated data vector caused by propagation and attenuation of the I and Q components of the signal. Prior to combining the outputs of the rake fingers, the outputs are de-rotated and weighted by their relative strength. Thus the combination performed by the section 26 is a coherent maximum ratio combining process. Finally, the symbols are presented to a de-interleaver/decoder circuit that deinterleaves the received data stream and further uses a decoder such as a Viterbi decoder to remove coding. The decoded data are then made available to higher layer communication protocols.

SUMMARY OF THE PREFERRED EMBODIMENTS

An aspect of the invention provides a receiver section for a spread spectrum communication system incorporating a receiver section. The receiver section includes a plurality of processing units that are configurable to provide a plurality of correlation functions. The receiver section includes a signal acquisition section, coupled to receive analog communication signals. The signal acquisition section outputs sampled signals corresponding to a plurality of multipath components. The plurality of processing units receive data signals and perform correlation functions on the data signals. A controller is coupled to the processing units over a control signal path and outputs configuration information to the plurality of processing units to configure the plurality of processing units.

Another aspect of the present invention provides a spread spectrum radio system incorporating a receiver section. The receiver section includes an analog to digital converter receiving a signal and outputting a sampled data stream and an interpolator receiving the sampled data stream and generating an interpolated data stream including data derived from the sampled data stream. The receiver section further includes a timing selection circuit identifying one of the values of the interpolated data stream as a representative data sample.

Another aspect provides a receiver section for a spread spectrum communication system comprising a plurality of processing units configurable to provide a plurality of correlation functions. The receiver section includes a signal acquisition section, that receives analog communication signals and outputs a sampled data stream corresponding to a plurality of multipath components at a first oversampled data rate. An interpolator receives the sampled data stream and generates an interpolated data stream at a second oversampled data rate greater than the first oversampled first data rate; the plurality of processing units receiving data signals from the interpolated data stream and performing correlation functions on the data signals. A combining unit receives signals processed in a plurality of processing units, the combining unit weighting and combining the signals to generate symbol data.

Still another aspect of the present invention provides a receiver section for a spread spectrum communication system incorporating a receiver section. The receiver section includes a plurality of processing units, the processing units configurable to provide a plurality of correlation functions. The receiver section includes a signal acquisition section, where the signal acquisition section is coupled to receive analog communication signals, the signal acquisition section outputting a sampled data stream at a first oversampled data rate. The receiver section includes a modulator coupled to the signal acquisition section receiving and derotating the sampled data stream. An interpolator is coupled to the modulator and receives the sampled data stream and generates an interpolated data stream at a second oversampled data rate greater than the first oversampled first data rate. A frequency detector is coupled to the interpolator and determines a frequency correction in response to the frequency correction in derotating the data stream.

BRIEF DESCRIPTION OF THE DRAWINGS

Aspects of the present invention are illustrated in the various views of the drawings, which form a part of the present disclosure. The various aspects of the present invention and the advantages associated with practice of the invention will be best appreciated with reference to the various views of the drawings in conjunction with the detailed description, which follows.

FIG. 2A is an overview of a rake receiver architecture in accordance with an alternate implementation of the present invention;

FIG. 10 illustrates an allocation of correlators and processing units providing a configuration of the rake receiver for receiving and tracking three multipaths with two data channels, a pilot channel and a timing facility.

FIG. 11 illustrates another allocation of correlators and processing units providing a configuration of the rake receiver for receiving and tracking three multipaths with two data channels, a pilot channel and a timing facility.

DETAILED DESCRIPTION OF THE PREFERRED EMBODIMENTS

Figure 1:
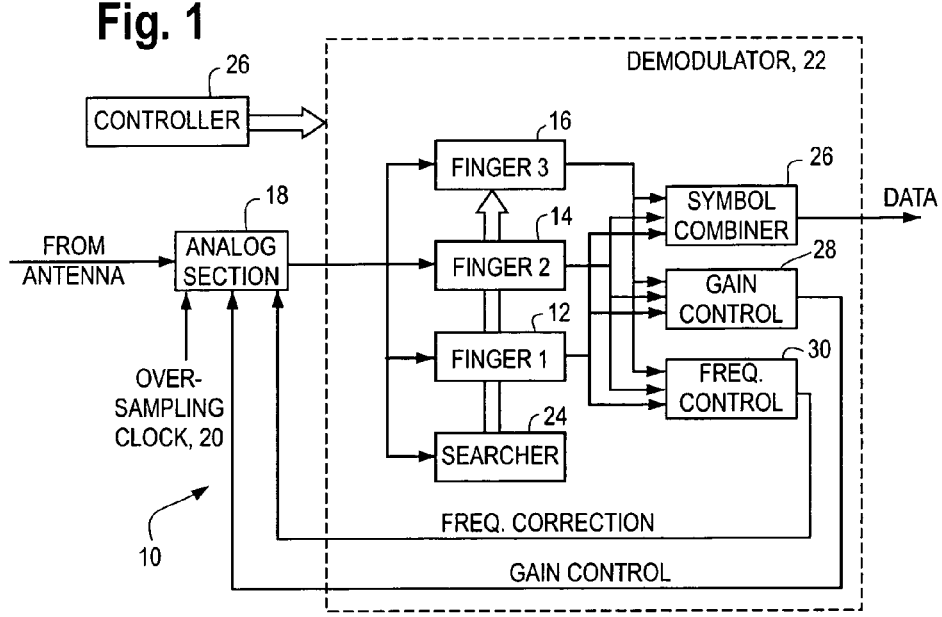
FIG. 1 illustrates a conventional implementation of a rake receiver that might be used for diversity reception of CDMA signals.

Certain implementations of a preferred universal architecture for a rake receiver include modular independent processing units that can be flexibly programmed to support different modes of operation. The modular and independent processing units preferably are capable of performing the basic correlation calculations of direct sequence CDMA (DS-CDMA). In preferred implementations each unit can be configured to perform the required synchronization and demodulation operations for a plurality of multipaths or signals. Hardware resources can be allocated and programmably reallocated to best address individual user or application requirements. Each unit preferably has an internal local memory coupled to receive configuration information from a controller that defines an organization and a mode of operation for the processing unit. A single controller may be used to configure and control the plural independent processing units or a number of controllers might be used in cooperation to achieve similar functionality.

Another implementation of a rake receiver may provide an overall flexible architecture that includes a plurality of configurable processing units. Each processing unit preferably includes a number of similar constituent circuits, each including a correlator with associated circuitry that can be used to configure the correlator for specific purposes. For example, each processing unit might include five or more like configurable correlator circuits that can individually be configured so that the collection of correlators performs a set of tasks such as pilot signal tracking and demodulation, timing tracking and recovering the data from a plurality of data channels. This set of tasks may be performed in correlators positioned in different processing units or in a single processing unit, depending on the configuration of the rake receiver at the time. Configurations can be changed.

In a particularly preferred aspect of some implementations of the rake receiver architecture, the parts of the rake receiver architecture are selectively powered so that portions of the rake receiver that are needed in a configuration are powered and those that are not needed are not powered. The selective powering may proceed not only on the basis of processing units but also within processing units in certain implementations. Thus, if a rake receiver includes three processing units each with ten configurable correlators and the rake receiver is configured to provide a correlator for pilot recovery, a correlator for timing, and two correlators for two data signals, the rake receiver can be configured to have two processing units powered down and one processing unit partially powered. Within the one partially powered processing unit, six of the configurable correlator circuits are powered down and four correlators are powered.

According to other implementations, the receiver conducts frequency synthesis and timing correction in the digital domain using all-digital frequency and timing correction techniques. The one or more antennas of the receiver receive data and the receiver digitizes and stores the data. Data samples that might correspond to one or more multipaths and one or more distinct signals from one or more users are collected and stored. Timing information is derived from the stored data samples and frequency synthesis is performed on the stored data sets. Timing feedback need not be supplied to the analog section of the receiver. This independence allows the receiver to be used with one to several antennas with minor design modifications.

A preferred aspect of a rake receiver architecture may provide a reduced power consumption receiver. An antenna of the receiver receives data and provides the data to a corresponding analog to digital converter. The analog to digital converter preferably digitizes and outputs a first set of data samples. An interpolator receives the first set of data samples and performs interpolation to provide a second data set derived from the first set of data samples having more sample points than the first set of data samples. Most preferably the second data set includes the first set of data samples. Output data samples are identified by selecting the appropriate one or more data points from the second set of data points that corresponds to the appropriate and preferably optimum sampling position of each incoming chip.

Another preferred aspect of a rake receiver architecture uses interpolation to provide frequency correction for an all digital frequency tracking unit. An antenna of the receiver receives data and provides the data to a corresponding analog to digital converter, which digitizes and outputs a first set of data samples. An interpolator receives the first set of data samples and performs interpolation to provide a second data set. Output data samples are identified within a processing unit by selecting the appropriate one or more data points from the second set of data points that corresponds to the appropriate sampling position for the on-time sample. The relative position of that sample within the second data set indicates the timing offset and is used by the frequency tracking unit for frequency correction.

These and other aspects of the preferred rake receiver architecture may be implemented singly or in combination. The presently preferred implementation uses all of these aspects of the architecture in combination. The present discussion is in terms of a receiver section for communicating using CDMA technology over a radio link. It should be understood that the circuits and architecture discussed here could be implemented either in a base station or in a mobile handset application. This flexibility reflects certain aspects of the architecture and designs discussed here. Generally only minor changes in the design of the integrated circuit and changes to the firmware of the integrated circuit are needed to change between a base station application and a mobile receiver application. Depending on the particular implementation of a base station application it may be desirable to have more than one frequency unit while a mobile receiver typically needs only a single frequency unit. The architecture discussed here can accommodate a single user as in a mobile receiver or can accommodate a number of users as would be typical of a base station.

In addition, the architecture and the design discussed here readily accommodate one antenna, two antennas or greater numbers of antennas. Using two or more antennas in a system provides greater signal to noise performance and better quality of service, but does represent an added expense and complication. The rake receiver described here reduces the difficulty associated with implementing multiple antenna systems and reduces the amount of support circuitry such as analog to digital converters that are necessary to support multiple antenna operation. On the other hand, the rake receiver readily operates with a single antenna and so the same receiver circuitry can be used in multiple antenna systems and in single antenna, low cost systems.

Also, while the discussion here primarily focuses on the receiver sections of these communication devices, those of ordinary skill will appreciate that these circuits are generally part of transceivers. As such, certain of the circuits illustrated herein for receiving signals may also be part of signal modulation or transmission circuitry.

Preferred embodiments of the present invention are implemented as integrated circuits and most preferably all of the components of the circuit are implemented on a single chip. As those of skill in the art will appreciate that aspects of the circuitry described here might be implemented on multiple chips if such a configuration is better suited and capable of providing sufficient performance.

Figure 2:
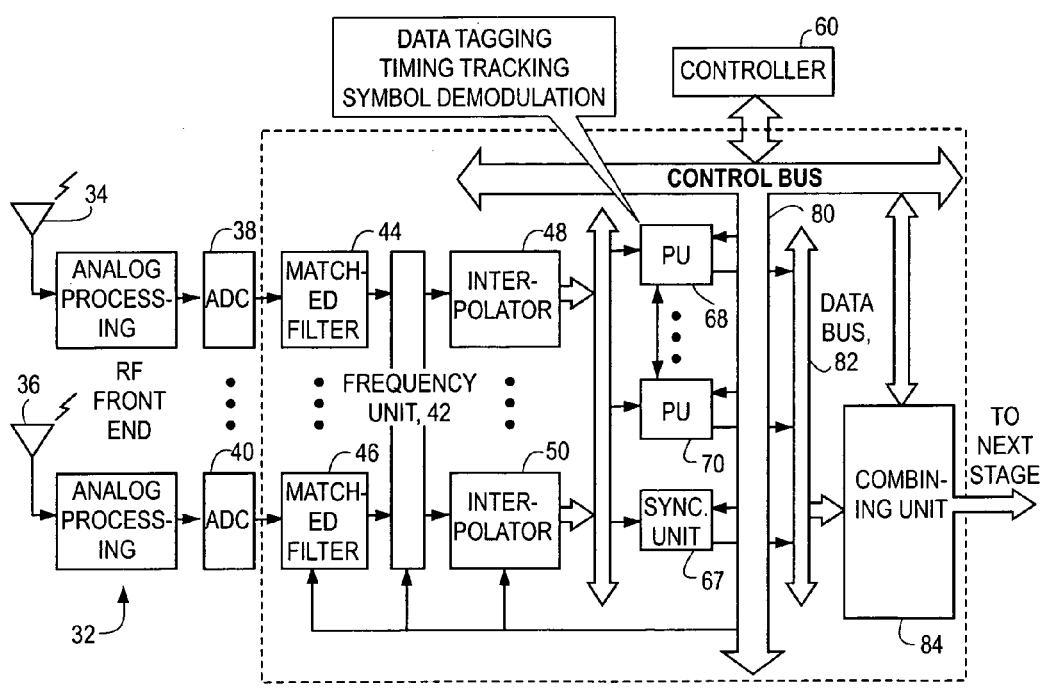
FIG. 2 is an overview of a rake receiver architecture in accordance with a preferred implementation of the present invention.

With reference to FIG. 2, an RF front end section 32 receives wireless (i.e., radio) signals from one or more antennas 34, 36. The one or more received RF signals are mixed down to baseband and sampled by the analog to digital converters 38, 40. The signals output from the ADC's 38, 40 are passed through corresponding matched filters 44, 46, through a frequency unit 42, and are provided to timing interpolators 48, 50. The timing interpolators are used to achieve precision in the timing loops while not sampling as often with the analog to digital converters 38, 40. Interpolation takes the sampled data from the ADCs and generates additional samples intermediate between the samples generated by the ADCs using, for example, linear filtering. More complicated filtering could be used such as parabolic filtering. Using interpolation to in part establish the timing and values of samples allows the analog to digital converters to sample at two to four times the chip rate in this illustrative and presently preferred embodiment, while still providing the desired number of signal samples. In many applications it is desirable to provide, for example, output samples that are oversampled at eight times the chip rate. This reduced sampling by the analog to digital converters decreases the power consumption associated with the analog to digital converters ("ADC"). The interpolated and sampled signals are then provided over a bus 66 to the synchronization unit

67 or to one of the processing units. As is discussed above and in greater detail below, the processing units are configurable units whose components can be programmed to perform the correlation and other functions needed to recover CDMA signals.

When the receiver is initially powered up, the locally generated PN code is not synchronized with the transmitted PN code. Thus the receiver initially synchronizes to the timing and coding of the target PN code. It should be appreciated that it is possible that the local PN code will be pre-established as corresponding to the incoming PN code and only timing synchronization is necessary. Synchronization proceeds by performing an energy detection successive sliding correlation to locate the offset at which the locally generated PN code is within one chip period ($T_C$) of the incoming PN code. Generally the pilot PN code is known and so this process iteratively performs correlations to identify the proper offset. Due to the nature of the autocorrelation function of the PN codes, the coarse PN code timing is preferably acquired before any phase measurement or tracking is attempted. Thus, this procedure is preferably performed non-coherently by effectively measuring the energy associated with the autocorrelation measured at a series of specific offsets.

The synchronization unit 67 correlates the initial data in I and Q format against a locally generated PN code. During each correlation two offsets are tested. One is assumed to be on-time and the other is assumed to be delayed by half a chip. This technique ensures that all candidate offsets are tested. Once the correlation period is over (defined by the controller 60 at start up), the results are presented to an energy calculation circuit. The result is then presented to an accumulation block for post spreading averaging. The number of post spreading averages to be performed is set by the controller 60 and is stored in local memory within the synchronization unit 67. The results are finally stored in a search result interface awaiting transfer back to the controller 60 for processing.

In the search mode the synchronization unit 67 presents an energy trace to the controller 60 at different time instants. The controller 60 receives this data and decides on the best offsets according to which offsets show potential as being "good" multipath offsets to track. Generally the strongest pilot signals are tracked. On identifying an offset to track, the controller 60 assigns either a new correlator in a processing unit 68, 70 to that offset or searches for a correlator that is tracking a weaker multipath and reassigns it to track the newer and stronger identified multipath. These candidate offsets are stored in the assigned local processing unit (68, 70) memory to be used during finger configuration.

Once the controller 60 has decided that a specific multipath is valid (that is, it should be tracked), the offset for that multipath is calculated in reference to a fixed local timing reference and is provided to an assigned processing unit 68, 70. The assigned processing unit uses the multipath's offset to generate the initial state for a correlator within the processing unit. The assigned processing unit also generates the local PN codes for demodulation. The PN codes are preferably generated by appropriately configured linear feedback shift registers. The required offset and desired PN code information are loaded into the preferred linear feedback shift registers (LFSR) within the processing unit to generate the local PN code for that multipath.

Prior to symbol demodulation, fine time and frequency lock preferably are established to maximize the signal to noise ratio (SNR). In the rake receiver architecture illustrated by FIG. 2, it is particularly preferred that all synchronization is performed after the sampling process is completed, thus allowing the ADCs 38, 40 to be completely free running with no feedback constraints. This feature is especially desirable in the case that a single ADC per antenna is serving a multitude of users and each user might have a different relative phase. In other implementations in which the ADC is not free running, each user for each antenna typically requires an independent feedback control and a separate ADC. Such a system is more complicated, expensive and uses more power.

Due to the flexibility of the illustrated architecture, extending from a single antenna, single user design to a design providing several antennas serving one user is straight forward and requires minor modifications. As is shown in FIG. 2, a separate matched filter and interpolator unit preferably are provided when a multiple antenna diversity system is provided, while only a single matched filter and interpolator is needed for a single antenna system. The rest of the architecture remains the same.

Extending this architecture to support a multitude of users and antennas (as is the case at a base station) preferably adds a number of independent frequency filters and frequency synthesis units within the frequency unit 42 of FIG. 2. This is preferred because each user will have a different frequency offset from the base-station depending on the circumstances of the established communication link and the specific hardware being utilized at the mobile terminal. Thus it is preferred that each user have a separate frequency tracking filter and synthesizer. However as previously discussed, it is preferred that all the multipaths of a specific user's communication link share one frequency tracking loop. The rest of the architecture will require minor firmware modifications but no architectural changes to accommodate the use of this rake receiver architecture and design for a base station.

By performing interpolation after sampling, a single sampled frame can be reused for all multipaths associated with a user, with interpolation filters in the respective processing units 68, 70 tracking the optimum sampling instant independently. This greatly relaxes the requirements on the ADC section both in terms of power consumption and silicon real estate. The interpolation filters select the sampling instant for the on-time signal and that sample is used for correlation and other calculations using the sample. The relative position of the optimum sampling time within the group of eight relevant samples is also used to adjust the frequency in the digital frequency unit.

Figure 3:
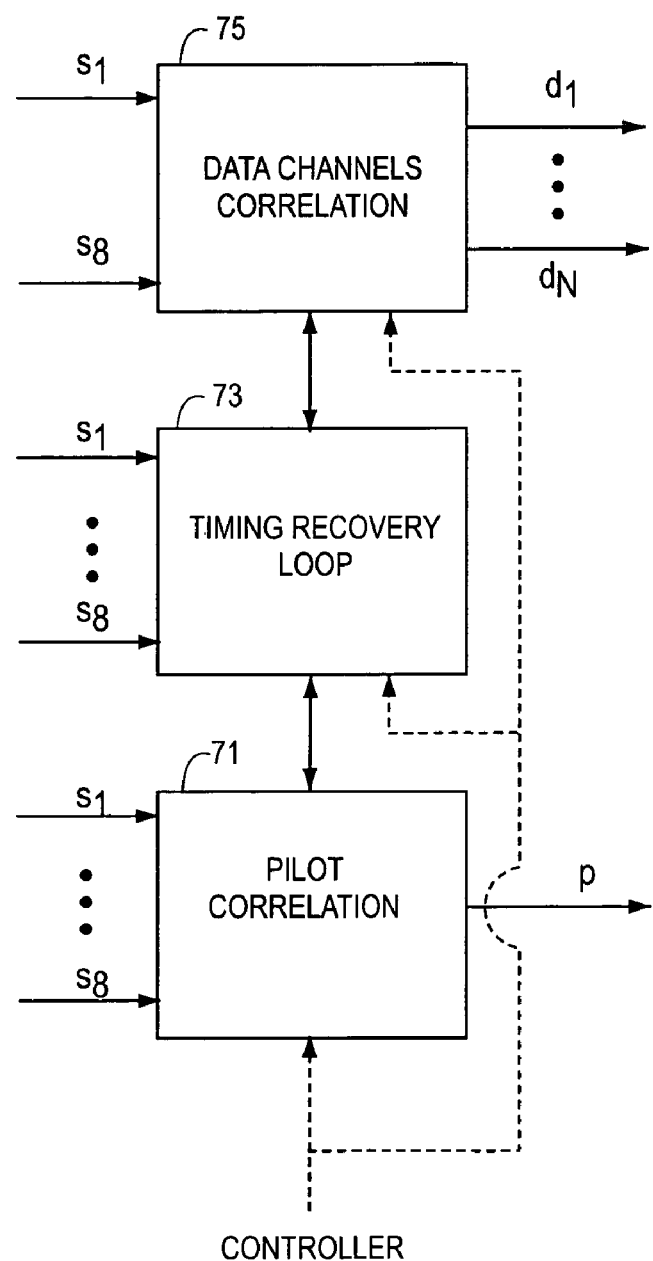
FIG. 3 schematically illustrates the functions included within a processing unit in accordance with aspects of the present invention.

The processing units are designed to be substantially self-contained. The controller 60 configures the processing unit for each multipath profile or scenario and, once configured, the processing unit operates independently. FIG. 3 illustrates schematically certain of the functions that preferably may be performed within the flexible circuitry of the processing unit. Often the functions illustrated in FIG. 3 are performed in a single processing unit, with the other processing units in the rake receiver in a powered down configuration. It is possible, however, for the functions of FIG. 3 to be implemented in more than one processing unit.

The basic functions of the processing unit include pilot correlation 71, timing recovery 73 and data channel correlation 75. As illustrated, pilot correlation and timing recovery are performed to facilitate the data symbol decoding and recovery. Each of these functions can be assigned to any one of the correlator circuits by the processor and the correlator will be configured to perform the function. Routing within the rake receiver and processing unit is accomplished by addressing or by marking the data associated with a signal with a destination or function header. Of course, proper routing depends on the configuration of a processing unit so that data are routed to powered correlators that are properly configured for the function needed to process the data. The processing unit receives pilot, timing and data signal samples from the data bus and provides those samples to the configured correlators within the processing unit. Samples $S_1$ to $S_8$ are presented to the functionally proper unit, e.g., pilot signals are routed to the correlator that is configured for pilot correlation and the pilot signal is identified and decoded to provide offset and other information. The set of eight samples presented in this illustration to each of the functional units preferably includes both sampled data and interpolated data. The proper sampling time is determined according to the corresponding interpolation filter and the proper sample is selected and input to the corresponding correlator of the functional unit.

Figure 4:
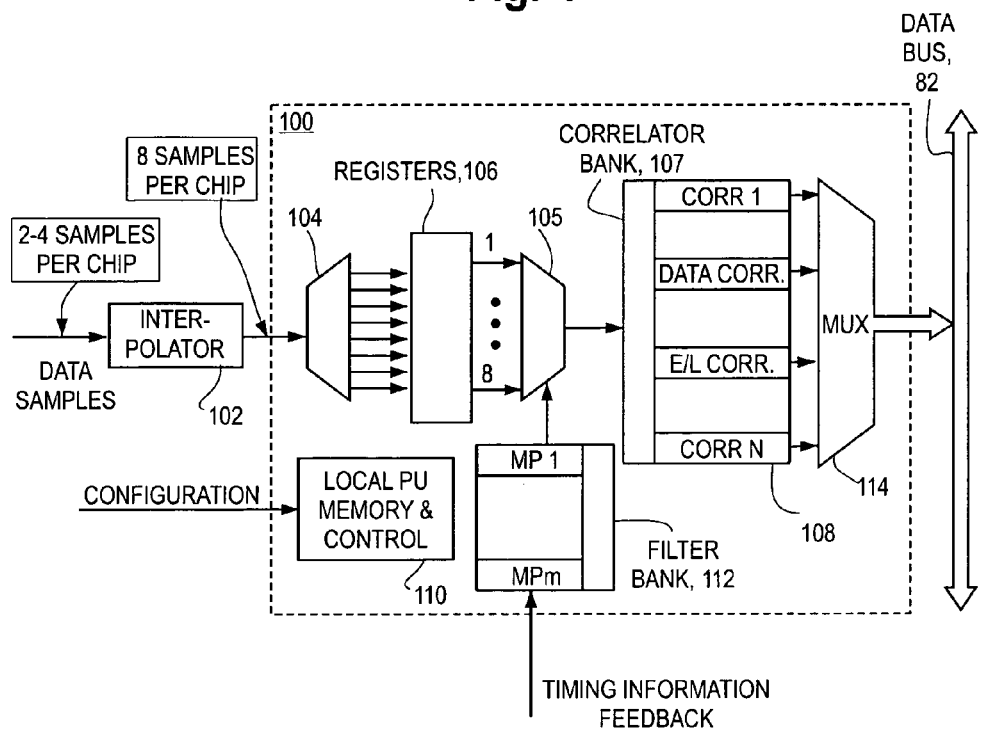
FIG. 4 is an exemplary illustration of a processing unit in accordance with aspects of the present invention.

FIG. 4 is a block diagram of a particularly preferred implementation of a processing unit. Referring to FIG. 4, the processing unit 100 receives samples from the ADC at 2–4 times the sampling rate. These samples preferably are then up sampled to eight samples per chip using a simple linear interpolator 102 and presented through a mutliplexer 104 to a bank of correlators 106. Each multipath is allocated a number of correlators 107 within the processing unit 100 depending on the number of orthogonal channels currently used by the transmitter. For each multipath only one PN code is received and used throughout the time that the multipath is being processed. Each processing unit 100 preferably generates the required orthogonal codes within the processing unit.

Assuming, for example, that the transmitter has three orthogonal data channels and a common pilot, each multipath will be allocated five channels. Three of the channels are for data recovery, where each correlator is capable of independently removing the orthogonal codes off the descrambled sample. One correlator is allocated for pilot recovery, with the length of the correlation preferably adjustable. Preferably the length of the pilot correlation period is adjusted to cover regular transmission using one antenna or to cover space time transmit diversity (STTD) transmission using more than one antenna in those implementations where the receiver section is used in such an STTD implementation. One correlator 108 within the processing unit preferably is assigned and used for timing purposes including estimating the difference between the early and the late samples. Only one correlator is used to compute the difference of both the early and the late samples by using differential coding.

The design is flexible enough that any correlator can assume any role according to a predefined configuration word that is received by the processing unit 100 from the controller 60 once with every new multipath/channel profile setting. The timing and reasoning for reconfiguration can vary significantly, but reconfiguration may be desirable upon power up and when multipaths are either added or lost from a communication link. Most preferably, the configuration word also establishes which processing units will be powered and which will be powered down. In addition, the configuration word preferably establishes which portions of a processing unit are powered and which are powered down. The selective powering operation provided, for example, by transmitting configuration words is advantageous in low power operation, which is frequently a concern in mobile receiver applications. Configuration words are distributed within the FIG. 2 architecture over the control bus 80 to the specified processing unit 68, 70. The configuration word is stored within local memory 110 of the processing unit 100 (FIG. 4). Once the configuration word is received, the processing unit 100 is free running until a reallocation of correlators is requested.

The configuration word generated by the controller 60 specifies which correlator within the processing unit 100 will be activated (powered and configured) and the spreading factor and orthogonal code to be used for that correlator. The configuration word also specifies whether the correlator will be employed as a regular (on-time) correlator or an early-late (timing recovery) correlator. Correlators run at a higher clock rate than the sampling rate so that all the active correlators are cycled through prior to receiving a new chip. The clock of the correlators is set locally within the processing units and is preferably independent of the timing of the front end. The processing unit includes one or more filters, associated with each multipath and located in a filter bank 112, to filter the early-late signal and identify the appropriate sample to be selected from the sample register.

After the correlator demodulates a user signal, the recovered symbol data are held until the processing unit is given access to the data bus 82. Each processing unit has the capability of checking the bus for activity. If the bus is inactive, the processing unit commences transferring the output of its correlations to the common bus. When allowed, the processing unit outputs data through the multiplexer 114 to the data bus 82. From there the data passes to the combining unit 84 (FIG. 2) for further processing that may be conducted according to conventional teachings. However, in the case that the bus 82 is being utilized by another unit, the processing unit retains its output for a duration set by the smallest spreading factor of the communication system being implemented. The combining unit 84 performs maximum ratio combination of the different multipath components.

In general the processing units are independent of the standard or protocol with which the communication device is used. Differing standards or protocols impact on the synchronization unit and are handled there. Preferably the appropriate information for updating the synchronization is provided dynamically from long term storage elsewhere in the integrated circuit or within the synchronization unit. Most preferably the long term storage is flash memory or another form of long term but modifiable storage so that the standard or protocol dependent information can be modified without requiring rework or modification of the integrated circuit. In particularly preferred implementations the long term memory can be overwritten or modified after manufacture of the integrated circuit is complete, such as in the field where the circuit is installed in a base station or mobile receiver.

Figure 5:
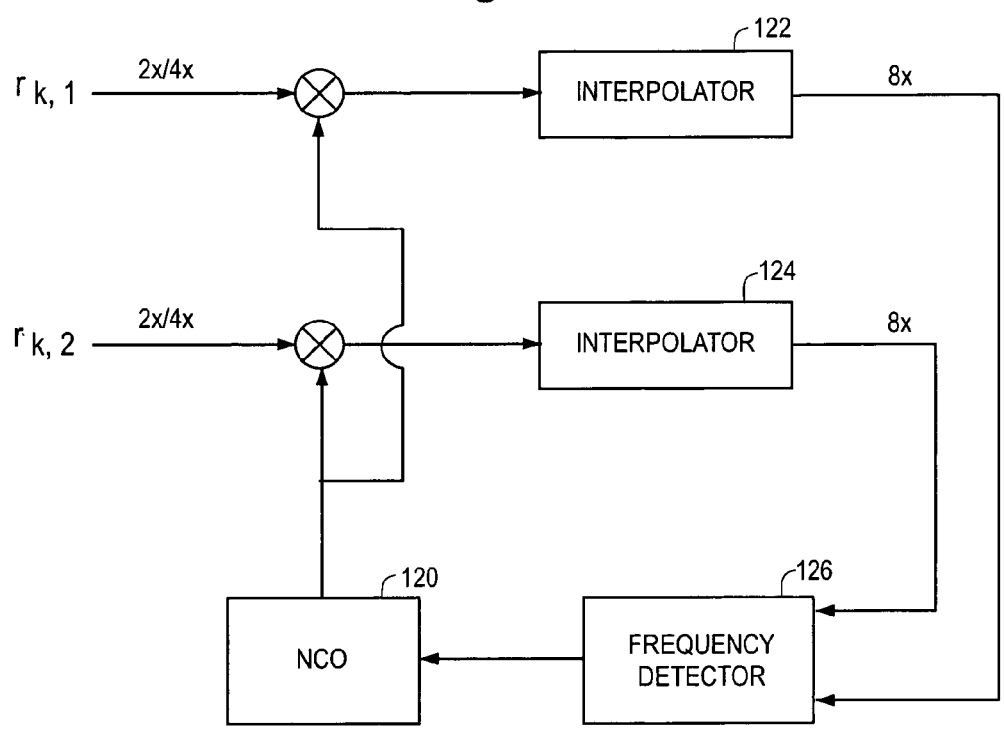
FIG. 5 illustrates a frequency recovery loop that can be used in recovering and establishing frequencies in the FIG. 2 architecture of a rake receiver.

FIG. 5 shows the overall architecture of the frequency recovery loop. Signals derived from the illustrated two antennas are first derotated on the basis of the signal coming from the numerically controlled oscillator 120. As discussed, the use of two antennas is exemplary and presently preferred, but other configurations are contemplated, including single antenna implementations. Note that both antenna branches are derotated using the same signal. The frequency recovery loop is closed as follows. The received signals are first interpolated by the corresponding one of the interpolators 122, 124 to produce 8 times over-sampled signals. The illustrated interpolators can be implemented as linear filters. The over-sampled signals output from the interpolators 122, 124 are used to compute the frequency offset of the incoming signal. The frequency offset signal is then used to drive the direct digital frequency synthesizer ("DDFS") that produces an output signal that corrects the frequency error of the incoming signal. Frequency detector 126 feeds back a further estimate of the frequency to the numerically controlled oscillator 120. In this way closed loop frequency control is obtained without including the analog front end within the loop.

Figure 6:
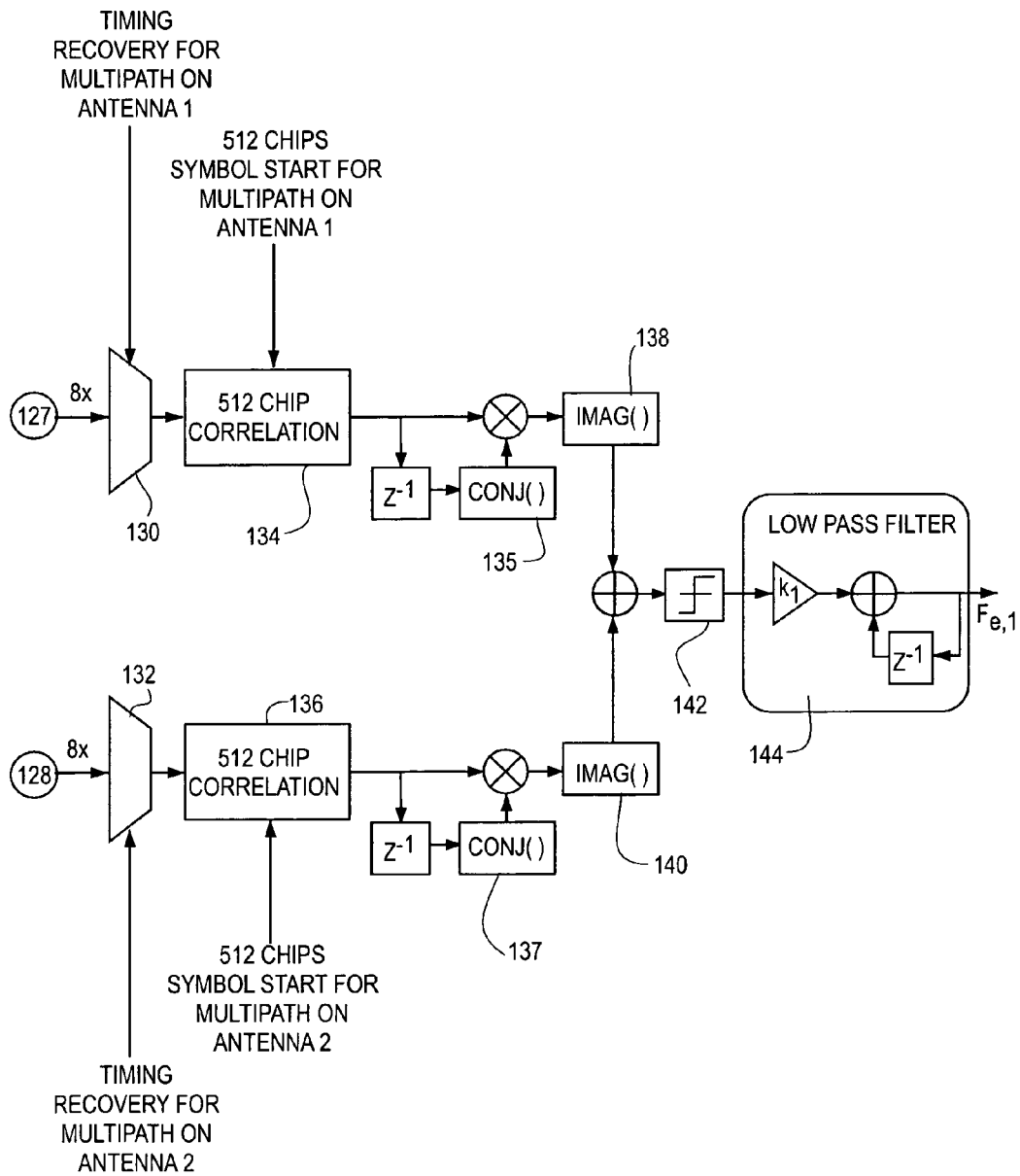
FIG. 6 illustrates the architecture of a frequency detector that can be used in the FIG. 2 architecture of a rake receiver.

FIG. 6 illustrates the frequency detector architecture. The frequency detector is indicated at 126 in the FIG. 5 architecture. Note that the frequency detector architecture spans the architecture of the FIG. 2 rake receiver, with aspects of the frequency detector implemented in a correlator within a processing unit. Other aspects of the frequency detector architecture are implemented in the combining unit of the rake receiver. The frequency detector of FIG. 6 preferably extracts its frequency information from the strongest multipath. That is, the controller selects the strongest multipath from each antenna that will be used for frequency recovery. The pilot signals 127, 128 are first down-sampled according to the timing recovery information for the multipath. Timing recovery is performed in part by the illustrated circuits 130, 132 that select the appropriate sample and time adjustment from the eight samples output by the interpolator 102 (shown in FIG. 4). This portion of the frequency detector architecture corresponds to the selector circuit 105 illustrated in FIG. 4. Referring again to FIG. 6, the appropriate signal samples are correlated over 512 chips using the orthogonal code of the pilot channel. The desired correlation values can be obtained by adding two consecutive correlations of 256 chips from the pilot correlation that is already available from the correlator blocks associated with the desired multipaths and so might be obtained from the available data. Correlation starts in the respective correlators 134, 136 with the first symbol starts aligned with the beginning of the frame according to the selected multipath.

This illustrative implementation uses a correlation of 512 chips in order to obtain orthoganality in case transmit diversity is active. Of course fewer chips could be used if transmit diversity is not a possibility. The $i^{th}$ 512 chip symbol from antenna n, n=1,2, is assumed to be $y_{i,n}$. In this preferred implementation, differential detection is used to estimate the rotation direction due to the frequency offset. That is, the rotation direction preferably is determined to be the imaginary part of the product of the current symbol, extracted by filters 138 or 140, and the conjugate of the previous symbol. The circuits 135, 137 are preferably implemented as part of the combining unit 84 shown in FIG. 2 and combine equal gain weighted estimates of the symbols to obtain diversity from both antennas and the logic then makes a hard decision on the rotation direction. The signal is provided to slicer 142 (FIG. 6) which identifies the sign of the signal and passes the result to low pass filter 144, which integrates and low pass filters the output. The low pass filter 144 is typically implemented within the frequency unit 42 of FIG. 2 and is used in frequency correction.

The low pass filter ("LPF") coefficient $k_f$ of low pass filter 144 is set to $k_f=1$ for initial tracking and to $k_f=2^{-3}$ for steady-state tracking. Most preferably, the LPF coefficient is made programmable. The loop filter coefficient preferably is selected such that it provides fast convergence for initial tracking and low noise during steady-state tracking. In this illustration the frequency error word $F_{e,i}$ is given by:

$$F_{e,i} = F_{e,i-1} + k_f \text{sign}(\text{Imag}(y_{i,1} y^*_{i-1,1}) + \text{Imag}(y_{i,2} y^*_{i-1,2})).$$

The accumulator is initialized with a value proportional to the frequency offset computed by the frequency acquisition circuit. There is a direct relation between the frequency error word and the actual frequency offset as discussed below. The low pass filter 144 preferably operates at the symbol rate.

Figure 7:
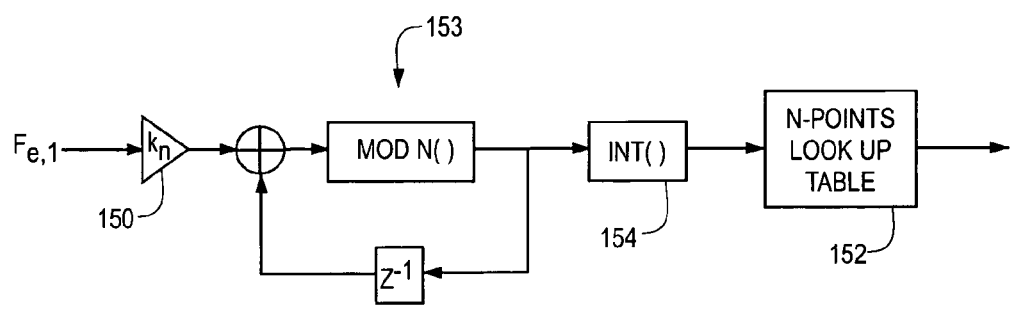
FIG. 7 illustrates a distributed digital frequency synthesizer (DDFS) that can be used in the FIG. 2 architecture of a rake receiver.

FIG. 7 shows a preferred architecture of the direct digital frequency synthesizer ("DDFS"). The DDFS includes the numerically controlled oscillator 120 (as elements 150 and 153) of FIG. 4 and is generally implemented as part of the frequency unit of the FIG. 2 architecture. The DDFS illustrated by the FIG. 7 block preferably produces a complex sinusoid with a frequency proportional to the input frequency word. The input frequency word $F_{e,i}$ is first multiplied by a constant $k_n$ in multiplier 150. $k_n$ relates to the frequency word for the DDFS parameters. In the illustrated embodiment, $k_n$ depends on the number of points N in the look-up table 152, the chip rate $F_c$, and the frequency resolution $F_r$ (note that in this preferred illustration $k_n$ and $k_f$ both relate to the frequency resolution). The frequency resolution is given by:

$$F_r = \frac{F_c k_f k_n}{N} \text{Hz},$$

and the actual frequency offset is given by:

$$F_{off} = \frac{F_{e,i} F_c k_n}{N} \text{Hz}.$$

The DDFS of FIG. 7 preferably accumulates the adjusted frequency word to produce the current phase of the output sinusoid. In this illustration the accumulator 153 preferably works at the chip rate (that is, samples within a chip are all multiplied by the same value) and accumulates positive values mod N. The integer part 154 of the accumulated value indicates which point in the look-up table 152 should be output. The points in the look-up tables are defined as:

$$y(n) = e^{-j\frac{2\pi n}{N}}.$$

Note the negative feedback in the definition of the look-up table points. The output of the FIG. 7 frequency synthesis circuit is multiplied with the incoming signal to derotate the signal.

Figure 8:
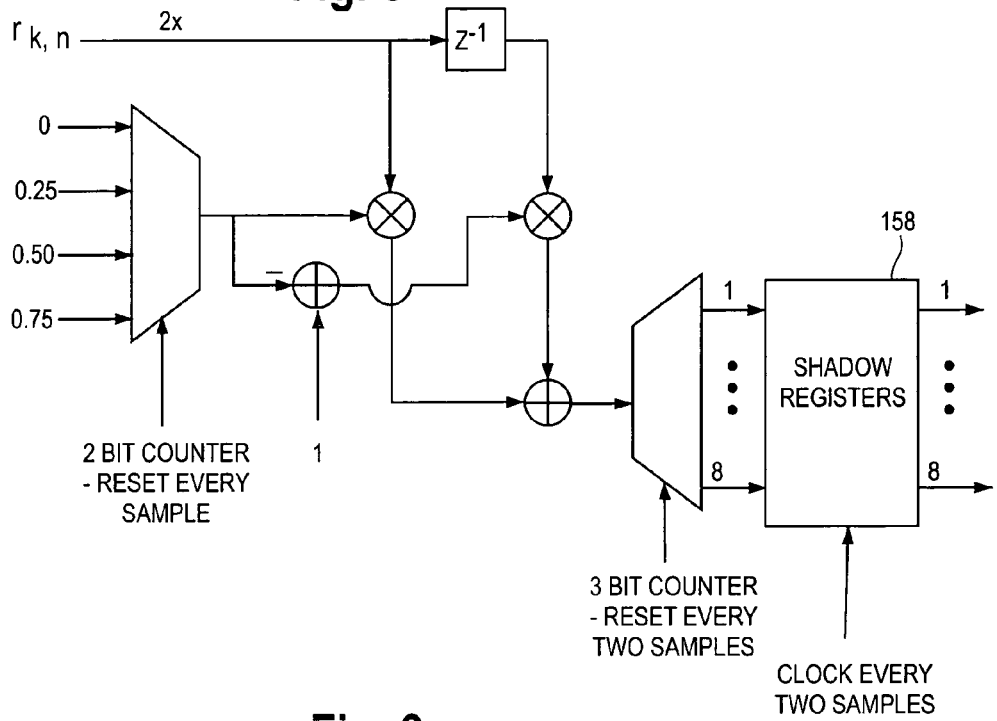
FIG. 8 illustrates an architecture for a two times oversampled interpolator that might be used in a single antenna implementation of the FIG. 2 architecture.

The timing recovery loop (FIG. 4) selects for each chip the correct sampling time by picking one sample out of the eight available samples per chip. In this particularly preferred implementation, the interpolator over-samples the incoming signal to produce an eight times over-sampled signal. This is done by linearly interpolating new samples between the available samples. The incoming signal can be either a 2 times or a 4 times over-sampled signal. FIG. 8 illustrates the interpolator architecture for a single antenna. The complete architecture for a dual antenna receiver provides a second, similar interpolator, thereby reproducing the same architecture for each antenna.

The interpolator architecture of FIG. 8 is for a two times over-sampled signal. For each incoming sample $r_{k,n}$, in this presently preferred and illustrative interpolator, the following four samples are computed:

$$\begin{cases} r_{k-1,n} \\ 0.75r_{k-1,n} + 0.25r_{k,n} \\ 0.5r_{k-1,n} + 0.5r_{k,n} \\ 0.25r_{k-1,n} + 0.75r_{k,n} \end{cases}.$$

These values are presented at the input of the first four shadow registers 158. The process is repeated for the next incoming sample and the new interpolated values are presented at the input of the next four shadow registers 158. The shadow registers referenced here and in the discussion below with reference to FIG. 9 correspond to the registers 104 shown in FIG. 4. After the eight values are stored in the registers, the shadow registers 158 are clocked to output the eight samples for the current chip that are available for the timing recovery. That is, for the k−2i sample, with i an integer, the following samples are made available for the timing recovery:

$$\begin{cases} r_{k-2,n} \\ 0.75r_{k-2,n} + 0.25r_{k-1,n} \\ 0.5r_{k-2,n} + 0.5r_{k-1,n} \\ 0.25r_{k-2,n} + 0.75r_{k-1,n} \\ r_{k-1,n} \\ 0.75r_{k-1,n} + 0.25r_{k,n} \\ 0.5r_{k-1,n} + 0.5r_{k,n} \\ 0.25r_{k-1,n} + 0.75r_{k,n} \end{cases}.$$

Figure 9:
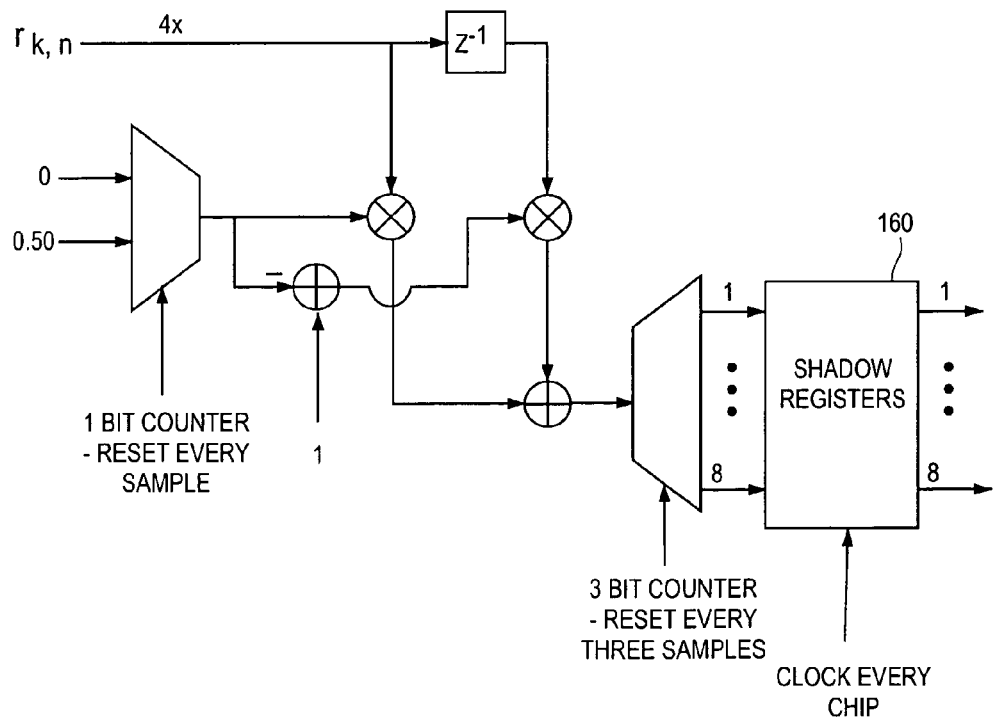
FIG. 9 illustrates an architecture for a four times oversampled interpolator that might be used in a single antenna implementation of the FIG. 2 architecture.

FIG. 9 shows an embodiment of a preferred interpolator architecture for a four times over-sampled signal. For each incoming sample $r_{k,n}$, the following two samples are computed:

$$\begin{cases} r_{k-1,n} \\ 0.5r_{k-1,n} + 0.5r_{k,n} \end{cases}.$$

This interpolator thus provides the desired eight samples, with greater load on the analog front end than the FIG. 8 implementation but still with improved power consumption as compared to the conventional implementation. These values are presented at the input of the first two shadow registers 160. The process is repeated for the next three incoming samples and the new interpolated values are presented consecutively at the input of the next two shadow registers. At this point, the shadow registers 160 are clocked and the eight samples for the current chip are available for the timing recovery. That is, for the k−4i sample, with i an integer, the following samples are made available for the timing recovery:

$$\begin{cases} r_{k-4,n} \\ 0.5r_{k-4,n} + 0.5r_{k-3,n} \\ r_{k-3,n} \\ 0.5r_{k-3,n} + 0.5r_{k-2,n} \\ r_{k-2,n} \\ 0.5r_{k-2,n} + 0.5r_{k-1,n} \\ r_{k-1,n} \\ 0.5r_{k-1,n} + 0.5r_{k,n} \end{cases}.$$

The filtering operation established on the basis of the timing generated by the early/late correlator preferably is applied to this set of samples to select the appropriate sample for correlation and for frequency correction.

FIGS. 10 and 11 provide illustrations of different allocations of resources within the rake receiver of FIG. 2 to provide a particular receiver configuration. These figures are intended to illustrate not only the configuration of the FIG. 2 architecture but also the flexibility of that architecture in providing a variety of configurations to address the needs of a particular receiver application. The target system configuration utilizes a number of the preferred aspects of the architecture, with frequency synthesis and timing correction performed in a fully digital manner as discussed above with reference to FIGS. 5–7. The matched filters 44, 46 are selected to minimize inter-symbol interference. The timing offset is identified using the interpolators and filters of FIG. 2 in the manner discussed above. The synchronization unit 67 performs initial pilot detection. Different correlators are assigned to track and recover data corresponding to a number of multipath components. The combining unit 84 of FIG. 2 is used to combine the recovered signal components obtained by the correlators.

In the particular implementation of the FIG. 2 architecture used in this architecture there is a total of three processing units each including fifteen independent correlator resources. In other words, the processing units 68, 70 are each able to configure fifteen different correlators that can be used for the various purposes of tracking and recovering multipath components including pilot recovery, timing recovering and data symbol recovery. Three correlators are used in the simplest configuration to track and demodulate a multipath, so that each processing unit can track five multipaths. This assembly of three processing units each with fifteen correlator resources is capable of digitally tracking and recovering up to fifteen different multipaths.

For the specific configuration illustrated in FIGS. 10 and 11, two antennas are used for diversity reception of a single signal with the improved signal to noise properties that result. Two multipaths are detected with the first antenna 34 of FIG. 2 and another multipath is detected with the second antenna 36. All multipaths have a common pilot with a spreading factor of 256 and a first orthogonal code. Each of the multipaths further carries two separate data channels, with a first data channel having a spreading factor of 256 and a second orthogonal code and with a second data channel having a spreading factor of 128 and a third orthogonal code.

Such a signal might result from, for example, a communication link including a first data channel and a second voice channel.

This arrangement requires the following resources for each multipath: pilot requires one correlator configured to process a spreading factor of 256 and having an orthogonal code of one; a timing or early/late correlator having a spreading factor of 256 and an orthogonal code of one, a first data channel having a spreading factor of 256 and an orthogonal code of two, and a second data channel having a spreading factor of 128 and an orthogonal code of three. This configuration requires four correlators per multipath. Considering the three multipaths discussed above, the receiver needs to allocate twelve correlators within the forty-five available correlators.

FIG. 11 illustrates a first allocation of twelve correlators within a single processing unit on the FIG. 2. The other two processing units are powered down for power saving and three of the correlators in the powered processing unit are powered down. Digital frequency recovery is performed in the frequency unit and the powered processing unit locally performs timing tracking. The particular allocation and configuration of resources is effected by the controller 60 and the resulting configuration of resources is illustrated in FIG. 10.

The FIG. 2 architecture allows great freedom in allocating resources to service the target communication link. A different allocation of resources is illustrated in FIG. 11, with each multipath assigned to a different processing unit. Four correlators within each processing unit are powered and the remaining correlators are powered down to conserve power. The frequency unit performs digital frequency recovery and each processing unit locally performs timing tracking.

The present invention has been described with reference to certain preferred embodiments thereof but without an intention to limit the invention to these described embodiments. Those of ordinary skill in the art will appreciate that various modifications to the preferred embodiments of the present invention could be made within the general teachings of the present invention. Consequently, the present invention is not to be limited to the preferred embodiments thereof but instead the scope of the present invention is to be determined by the claims, which follow.

What is claimed:

1. A receiver section for a spread spectrum communication system, the receiver section comprising:
   a plurality of processing units, at least one of the plurality of processing units including a plurality of configurable correlator resources, wherein at least one of the plurality of configurable correlator resources is configurable to perform a plurality of correlation functions;
   a signal acquisition section, the signal acquisition section coupled to receive analog communication signals, the signal acquisition section outputting a sampled data stream corresponding to a plurality of multipath components, the plurality of processing units receiving data signals and performing correlation functions on the data signals;
   a controller, coupled to the plurality of processing units over a control signal path, the controller outputting configuration information to the plurality of processing units to configure the plurality of processing units.

2. The receiver section of claim 1, wherein the controller outputs the configuration information to define a configuration for the at least one of the plurality of processing units and the at least one of the plurality of processing units maintains that configuration until the controller outputs a new set of configuration information.

3. The receiver section of claim 2, wherein the configuration information includes information as to whether each of the plurality of processing units is powered or is powered down.

4. The receiver section of claim 1, wherein the at least one of the plurality of configurable correlator resources performs a first correlator function when the configuration information requires the at least one of the plurality of configurable correlator resources to perform the first correlator function, and wherein the at least one of the plurality of configurable correlator resources performs a second correlator function when the configuration information requires the at least one of the plurality of configurable correlator resources to perform the second correlator function.

5. The receiver section of claim 4, wherein the controller outputs the configuration information to define a configuration of the at least one of the plurality of processing units and the at least one of the plurality of configurable correlator resources, the at least one of the plurality of processing units and the at least one of the plurality of configurable correlator resources maintaining that configuration until the controller outputs a new set of configuration information.

6. The receiver section of claim 5, wherein the configuration information is in the form of a configuration word.

7. The receiver section of claim 1, wherein the plurality of correlation functions include a timing function, a pilot function and a data function.

8. The receiver section of claim 7, wherein the controller generates the configuration information in response to a change in received multipath signals.

9. The receiver section of claim 7, wherein, for each of the multipath components tracked by the receiver section, a configuration of a respective one of the processing units configures at least three of the plurality of configurable correlator resources within the respective one of the processing units, one of which correlator resources assumes a timing function, a second of which correlator resources assumes a pilot function, and a third of which correlator resources assumes a data function.

10. The receiver section of claim 1, wherein, during a first time period, the at least one of the plurality of configurable correlator resources is configurable in response to the configuration information to assume a timing function, a pilot function or a data function, and wherein another of the plurality of configurable correlator resources does not assume a timing function, a pilot function or a data function and is powered down.

11. The receiver section of claim 1, further comprising:
    an interpolator coupled to the signal acquisition section and receiving the sampled data stream, the interpolator generating an interpolated data stream including data derived from the sampled data stream; and
    a timing selection circuit identifying one of the values of the interpolated data stream as a representative data sample.

12. The receiver section of claim 11, wherein the signal acquisition section comprises an analog to digital converter that generates the sampled data stream, wherein the analog to digital converter is free running.

13. The receiver section of claim 12, further comprising a frequency correction circuit coupled to the interpolator and coupled to adjust a digital frequency outside of the signal acquisition section.

14. The receiver section of claim 11, further comprising a frequency correction circuit comprising a multiplier coupled to the interpolator; the multiplier receiving the sampled data stream and outputting a sampled data stream derotated by a signal responsive to a signal generated by the frequency correction circuit.

15. The receiver section of claim 11, wherein the interpolated data stream includes the sampled data stream and additional data points representing intervals between sampling times of the sampled data stream.

16. The receiver section of claim 11, wherein the timing selection circuit is within one of the plurality of processing units.

17. The receiver section of claim 1, further comprising:
an interpolator coupled to the signal acquisition section and receiving the sampled data stream, the interpolator generating an interpolated data stream including data derived from the sampled data stream; and
a data bus receiving the interpolated data stream from the interpolator and providing the interpolated data stream to at least one of the plurality of processing units.

18. The receiver section of claim 17, further comprising a control bus distinct from the data bus, the controller coupled to the at least one of the plurality of processing units by the control bus so that the configuration information passes over the control bus.

19. The receiver section of claim 1, wherein the receiver section is in a base station.

20. The receiver section of claim 1, wherein the receiver section is in a mobile handset.

21. The receiver section of claim 1, wherein the receiver section is coupled to a single antenna.

22. The receiver section of claim 1, wherein the receiver section is coupled to plural antennas.

23. The receiver section of claim 1, wherein the plurality of processing units includes first and second processing units, the plurality of configurable correlator resources includes first and second configurable correlator resources, and the plurality of correlation functions includes first and second correlation functions, wherein the first correlator resource is configured to perform the first correlation function and the second correlator resource is configured to perform the second correlation function, wherein the first and second correlator resources perform the first and second functions on a first multipath component.

24. The receiver section of claim 1, wherein the plurality of configurable correlator resources includes first, second, third, fourth and fifth configurable correlator resources, wherein, when a transmitter transmits a first signal defined by three scrambling codes to the receiver section, the third, fourth and fifth configurable correlator resources are configured to perform data channel functions, and wherein, when the transmitter transmits a second signal defined by two scrambling codes to the receiver section, the third and fourth configurable correlator resources are configured to perform data channel functions and the fifth configurable correlator resource is powered down.

25. The receiver section of claim 1, wherein the at least one configurable correlator resource performs a first correlation function during a first time period and performs a second correlation function during a second time period.

26. The receiver section of claim 1, wherein the plurality of configurable correlator resources include first and second configurable correlator resources, the first correlator resource being powered down and the second correlator resource being powered on during a first time period.

27. The receiver section of claim 26, wherein the configuration information instructs the first correlator resource to be powered down and the second correlator resource to be powered on during the first time period.

28. A receiver section for a spread spectrum communication system, the receiver section comprising:
a plurality of processing units, at least one of the plurality of processing units configurable to provide a plurality of correlation functions, at least one of the plurality of processing units including a plurality of configurable correlator resources, the plurality of configurable correlator resources configurable in response to configuration information to assume one of the plurality of correlation functions, the plurality of correlation functions including a timing function, a pilot function, and a data function;
a signal acquisition section, the signal acquisition section configured to receive analog communication signals, the signal acquisition section outputting a sampled data stream corresponding to a plurality of multipath components, the plurality of processing units receiving data signals and performing correlation functions on the data signals;
a controller, coupled to the plurality of processing units over a control signal path, the controller outputting the configuration information to the plurality of processing units to configure the plurality of processing units; wherein, for each of the multipath components traced by the receiver section, the configuration of the processing units configures at least three of the plurality of configurable correlator resources, one of which assumes the timing function, one of which assumes the pilot function and one of which assumes the data function.

29. The receiver section of claim 28, wherein the configuration information includes information as to whether each of the plurality of processing units is powered or is powered down.

30. The receiver section of claim 28, wherein the configuration information determines whether one or more of the plurality of configurable correlator resources is powered up or powered down.

31. The receiver section of claim 28, wherein a first of the plurality of configurable correlator resources is powered up and a second of the configurable correlator resources is powered down.

32. The receiver section of claim 28, further comprising:
an interpolator coupled to the signal acquisition section and receiving the sampled data stream, the interpolator generating an interpolated data stream including data derived from the sampled data stream; and
a timing selection circuit identifying one of the values of the interpolated data stream as a representative data sample.

33. A receiver section for a spread spectrum communication system, the receiver section comprising:
a plurality of processing units, each of the plurality of processing units configurable to provide a plurality of correlation functions and including a plurality of configurable correlator resources, the plurality of configurable correlator resources configurable in response to configuration information to assume a correlation function selected from the group of early/late timing correlator, pilot correlator, and data channel correlator;
a signal acquisition section, the signal acquisition section configured to receive analog communication signals, the signal acquisition section outputting a sampled data stream corresponding to a plurality of multipath components, the plurality of processing units receiving data signals and performing correlation functions on the data signals;

a controller, coupled to the plurality of processing units over a control signal path, the controller outputting the configuration information to the plurality of processing units to configure the plurality of processing units;

an interpolator coupled to the signal acquisition section and receiving the sampled data stream, the interpolator generating an interpolated data stream including data derived from the sampled data stream; and a timing selection circuit identifying one of the values of the interpolated data stream as a representative data sample, the timing selection circuit being positioned within one of the plurality of processing units.

34. The receiver section of claim 33, wherein the configuration information includes information as to whether each of the plurality of processing units is powered or is powered down.

35. The receiver section of claim 33, wherein a first of the plurality of configurable correlator resources is powered up and a second of the configurable correlator resources is powered down.

36. A receiver section for a spread spectrum communication system, the receiver section comprising:

a plurality of processing units, at least one of the plurality of processing units including first and second correlator resources, each correlator resource configurable to perform at least one of a plurality of correlation functions;

a signal acquisition section, the signal acquisition section configured to receive analog communication signals, the signal acquisition section outputting a sampled data stream corresponding to a plurality of multipath components, the plurality of processing units receiving data signals and performing correlation functions on the data signals;

a controller, coupled to the plurality of processing units over a control signal path, the controller outputting configuration information to the plurality of processing units to configure the plurality of processing units; wherein the first correlator resource is powered down during a first time period and the second correlator resource is powered on during the first time period.

37. The receiver section of claim 36, wherein the first and second correlator resources are each configurable to perform a plurality of correlation functions.

* * * * *